May 28, 1957 J. N. HOGG ET AL 2,794,089
SWITCHES FOR AUTOMOTIVE VEHICLES
Filed Dec. 20, 1954

INVENTOR
JAMES N. HOGG &
ARSINO J. D'ADDARIO
BY
their ATTORNEY

United States Patent Office 2,794,089
Patented May 28, 1957

2,794,089

SWITCHES FOR AUTOMOTIVE VEHICLES

James N. Hogg, New York, and Arsino John D'Addario, Mount Vernon, N. Y.

Application December 20, 1954, Serial No. 476,112

1 Claim. (Cl. 200—85)

This invention relates to switches for automotive vehicles and more particularly to a type of switch which will be operated by the weight of the driver imposed upon the seat of a vehicle.

A great deal of fuel is wasted and wear is imposed upon the engine of a motor vehicle when the driver is required to make many stops for the delivery of goods or for other purposes. This is occasioned by reason of the fact that the operator of the vehicle will usually permit the motor to run while he leaves the vehicle. In many cases, and particularly when a driver will make a number of deliveries in an apartment house or building containing a number of apartments or offices, the driver will invariably permit the motor to idle for relatively long periods while he leaves the vehicle to make his deliveries.

It is therefore one of the objects of the present invention to provide means by which the ignition system of a motor will be switched off automatically when the operator of the vehicle rises from the driver's seat to leave the vehicle.

It is another object of the invention to provide a simple form of switching mechanism for placement within the body of a vehicle seat and so arranged that as long as the weight of the operator is imposed upon the seat, the motor of the vehicle will continue to operate, but the ignition of the motor will be switched off as soon as the weight of the driver is raised from the seat and the motor will remain inoperative as long as the vehicle is unattended.

With these and other objects to be hereinafter set forth in view, we have devised the arrangement of parts to be described and more particularly pointed out in the claim appended hereto.

In the accompanying drawing, wherein an illustrative embodiment of the invention is disclosed.

Figure 1:
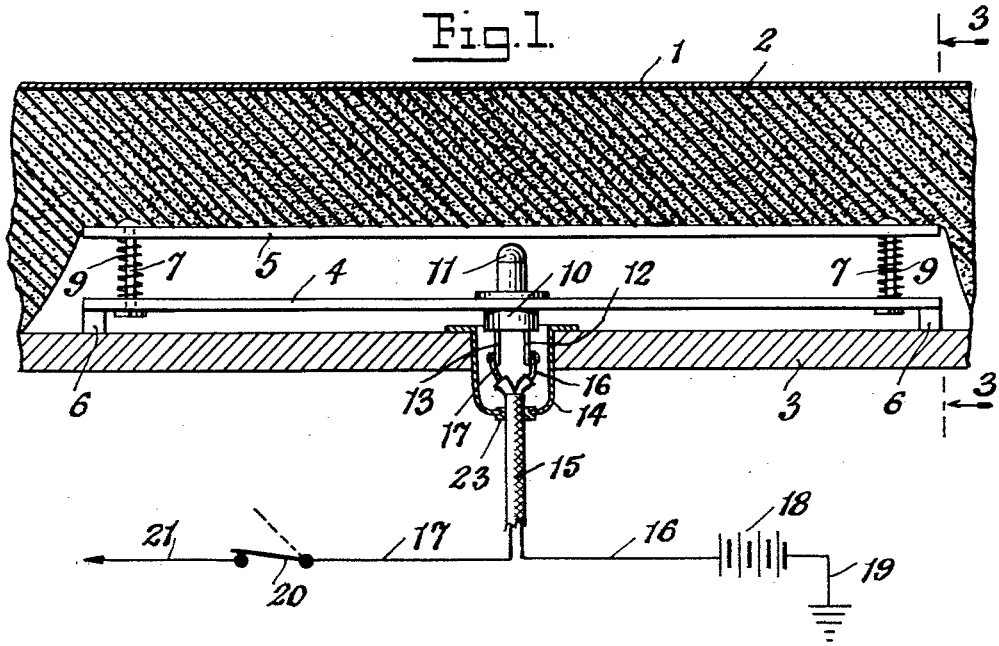
Fig. 1 is a vertical sectional view through the operator's seat of a motor vehicle, showing the improved switching device applied thereto.
Figure 2:
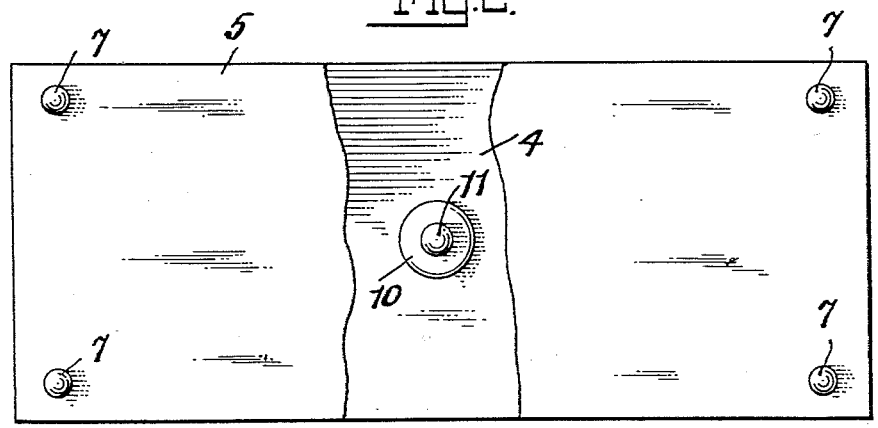
Fig. 2 is a top plan view of the switching device removed from the seat.
Figure 3:
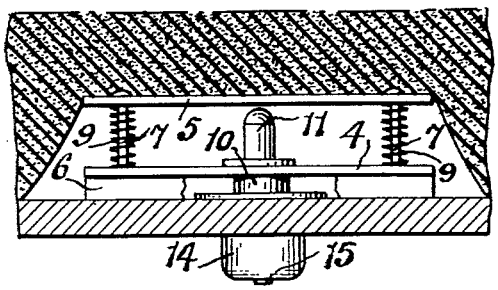
Fig. 3 is a sectional view, taken substantially on the line 3—3 of Fig. 1, looking in the direction of the arrows.

Referring to the drawing, 1 indicates the leather or other sheet material covering of a seat of an automotive vehicle, which seat may generally be of conventional form. The covering 1 encloses a foam rubber or other cushioning pad 2, which pad is supported upon the seat bottom indicated at 3. The seat may be mounted upon the usual pedestal or other seat support, if the seat is part of a truck or delivery van, or it can be otherwise suitably supported if the vehicle is of another type.

The switching device includes a pair of spaced, similarly shaped rectangular flat panels or plates indicated respectively at 4 and 5. The lower panel 4 rests upon or is suitably supported on or attached to the seat bottom 3, said panel 4 being preferably slightly elevated above the bottom 3 by the end supports or bars shown at 6 to allow clearance for the spring pins shown at 7.

The upper panel 5 is normally held spaced from the lower panel or in the elevated position shown in Fig. 1, by means of the coil springs 9 located adjacent to the four corners of the panel, and surrounding the pins 7. Additional pins and springs can be provided if required. It will be apparent from this construction that when the weight of the driver is imposed upon the seat, the top panel 5 will be caused to be moved downwardly, or in a direction toward the lower panel 4, compressing the springs 9 when doing so.

Mounted centrally of the lower panel 4 is a push-button switch 10 of conventional form, and which presents the end of its button or plunger 11 toward and slightly spaced from the underside of the upper panel 5 when said panel is in its normal position or when no one is seated on the seat. It will be obvious that when the operator is seated upon the seat, his weight will cause the upper panel 5 to be forced downwardly, bringing panel 5 into contact with the upper end of the push-button 11 to cause the same to operate the switch and close the ignition circuit in which the switch is included.

The switch 10 is provided with the two contacts indicated respectively at 12 and 13, which are shown as being concealed and protected by a cup 14 mounted in the bottom 3 of the seat. Extending through an insulating grommet 23 in the bottom of the cup 14 is a two-wire cable 15 composed of the two wires indicated respectively at 16 and 17. The wire shown at 16 is attached to the contact shown at 12, and said wire 16 extends to one side of the car battery indicated at 18. The wire shown at 17 connects to the contact shown at 13 and extends to the switch 20 which is the conventional ignition switch of the vehicle. The wire or lead shown at 21 extends to the ignition system in the known manner.

From the foregoing, the operation of the improved switching device will be readily understood. When the ignition switch 20 is closed, as shown in full lines in the drawing, the circuit to the battery will nevertheless remain open because of the location of the switch 10 between the switch 20 and the positive side of the battery. Therefore, to close circuit to the battery and permit the ignition system of the car to function, it is necessary for the operator of the car to be seated upon the driver's seat. When he takes his place upon the seat, panel 5 will be forced down and will depress the button or plunger 11 causing switch 10 to be closed and the circuit from the battery to the ignition system to be closed to permit the motor to be started. The motor will, of course, continue to run as long as the switch 10 is held closed by the weight of the operator upon the seat.

When the driver rises from the seat, springs 9 in cooperation with the spring normally included in the switch 10, will cause the panel 5 to be elevated and the switch 10 to be opened, immediately shutting off the motor. Thus, whenever the operator of the vehicle leaves his seat, the motor of the vehicle will become inoperative and will remain so as long as the driver's seat is unoccupied. The advantages of this are apparent, since the possibility of allowing the motor to run while the vehicle is unattended is completely avoided. Also in case of an accident in which a driver is thrown from the seat of the car, the motor will be instantly shut off, preventing damage and possible conflagration or explosion.

It is to be noted that the panels 4 and 5 by which the switch is supported and operated are relatively large in area. This enables the driver to shift about on the seat when required, or to shift his position to accommodate another passenger on the seat if desired, while still being able to cause operation of the switch without having to be directly seated above the push button 11. The several springs 9 may be made sufficiently firm to resist operation of the switch 10 by any relatively light weight imposed on the seat, such as when a light parcel or package might be tossed on the seat.

The switch may be mounted in numerous ways, but is preferably actually incorporated within the body of the seat so that its presence is not known except possibly to the operator. When the car is stored overnight or for long periods, the conventional switch 20 is used to lock the ignition system. At the start of a day's operation, the switch 20 may be closed and need not thereafter be used during the day except as a locking safeguard for the car, the seat switch 10 being operative to shut off the ignition each time that the car is left unattended.

Having described a single embodiment of the invention, it is obvious that the same is not to be restricted thereto, but is broad enough to cover all structures coming within the scope of the annexed claim.

What we claim is:

A switching device for the ignition system of an automotive vehicle comprising, a compressible car seat having an outer covering, a padding enclosed by said covering, a bottom for the seat under the padding, a flat, large-area panel resting on the bottom and elevated above the same, a second panel located above and spaced from the first panel and being of a size substantially similar to the first panel, spring means interposed between the panels and located adjacent to the ends of the same and maintaining them at a predetermined distance apart, a push-button switch mounted in the first panel at substantially the center thereof, said switch being spaced away from the spring means and presenting its operating plunger toward the second panel to be depressed thereby when a person rests on the seat, the panels being of an area to cause depression of the switch plunger while a person remains on the seat and without requiring the seated person to be located centrally of the panels, the bottom having an aperture through which at least a part of the switch extends, a housing secured to the bottom over said aperture and enclosing at least a portion of the switch, the switch being included in the ignition circuit and operative to hold said circuit open while a person is absent from the seat.

References Cited in the file of this patent

UNITED STATES PATENTS

| | | |
|---|---|---|
| 704,616 | Charles | July 15, 1902 |
| 857,446 | Comstock | June 18, 1907 |
| 930,761 | Jacka | Aug. 10, 1909 |
| 1,229,473 | Keenan | June 12, 1917 |
| 1,411,167 | Cutshall | Mar. 28, 1922 |
| 1,558,538 | Fick et al. | Oct. 27, 1925 |